United States Patent
Cink et al.

(10) Patent No.: US 7,086,196 B2
(45) Date of Patent: *Aug. 8, 2006

(54) PEST CONTROL DEVICE AND METHOD

(75) Inventors: James H. Cink, Ballwin, MO (US); Steven R. Sims, Maryland Heights, MO (US); Jonathan D. Berger, St. Louis, MO (US); Lee M. White, Manchester, MO (US); Jeffery A. Martin, Manchester, MO (US); H. Wayne Moran, Ballwin, MO (US)

(73) Assignee: Whitmire Micro-Gen Research Laboratories, Inc., St. Louis, MO (US)

( * ) Notice: Subject to any disclaimer, the term of this patent is extended or adjusted under 35 U.S.C. 154(b) by 110 days.

This patent is subject to a terminal disclaimer.

(21) Appl. No.: 10/400,773

(22) Filed: Mar. 25, 2003

(65) Prior Publication Data
US 2004/0187378 A1    Sep. 30, 2004

(51) Int. Cl.
*A01M 1/20* (2006.01)
(52) U.S. Cl. ............................................ 43/132.1
(58) Field of Classification Search .................. 43/124, 43/131, 132.1
See application file for complete search history.

(56) References Cited

U.S. PATENT DOCUMENTS

| | | | | |
|---|---|---|---|---|
| 5,950,356 A | * | 9/1999 | Nimocks | 43/131 |
| 5,953,855 A | * | 9/1999 | Edwards | 43/132.1 |
| 6,016,625 A | * | 1/2000 | Bishoff et al. | 43/121 |
| 6,543,182 B1 | | 4/2003 | Snell et al. | |
| 6,612,068 B1 | * | 9/2003 | Aesch, Jr. | 43/132.1 |
| 2001/0023552 A1 | * | 9/2001 | Fujimoto | 43/132.1 |
| 2002/0023382 A1 | * | 2/2002 | Snell et al. | 43/132.1 |

FOREIGN PATENT DOCUMENTS

| JP | 10-179000 | 7/1998 |
|---|---|---|
| JP | 2002-315493 | 10/2002 |

* cited by examiner

*Primary Examiner*—Kurt Rowan
(74) *Attorney, Agent, or Firm*—Senniger Powers

(57) ABSTRACT

An apparatus and method for detecting and/or controlling subterranean termites. A station at least partially receivable within a cavity has at least one opening therein to provide access by the termites to an interior volume of the station. The apparatus also includes an aggregation base attractive to the termites received within the interior volume of the station. The aggregation base includes at least one void for forming an aggregation site for the termites. The apparatus further includes a replaceable container received within the interior volume of the station and positioned adjacent the aggregation base. The container has at least one opening in a surface thereof facing the aggregation base to permit the passage of termites from the aggregation base to an interior chamber of the container. The container is sized and shaped such that the container may be removed from the station with minimal disturbance to the aggregation base, thereby preserving any aggregation site formed by the termites within the void of the aggregation base.

23 Claims, 8 Drawing Sheets

PEST CONTROL DEVICE AND METHOD

BACKGROUND OF THE INVENTION

This invention generally relates to a pest control device, and more particularly to a method and system for termite interception and baiting.

Many pests, such as termites, are serious threats throughout much of the world to structures or other objects containing wood or other cellulose containing components because these pests consume cellulose for nutrition. Subterranean termites, which typically dwell in the soil, often form large colonies. Members of the colony forage for food and thus burrow galleries or passageways in the soil outwardly from the nest. Portions of the food located by the foraging termites are returned to the nest. Termites are also known to possess means for communicating the location of a food source to other termites within the colony.

Many pest control devices are known and formed in a wide variety of configurations to monitor and eradicate the pests. One type of popular termite control device utilizes a monitoring food source made from a medium that is attractive to termites to encourage the termites to begin feeding from the device. The termites are then eliminated by providing a toxicant-containing bait placed at the feeding point in the termite control device. Perhaps most important, termite baiting results in the elimination or suppression of the entire termite colony, not just the members of the colony that reach the station site, because the toxicant-containing bait is brought to the nest with the returning termites. Because a termite bait must be consumed by termites in order to be effective, a technique must be developed to consistently and repeatedly make the bait available for consumption by members of a termite colony at a fixed point over a long enough period of time for the bait to have the intended toxic effect on the colony.

Typically, the toxic termite bait is applied only after contact has been established with a termite colony and termites are feeding from the station. Reasons for this include minimization of the amount of bait used, potential deterioration of bait if it is left in place for long periods of time in anticipation of prospective termite attack, minimization of the potential for unintended exposure of children and pets to the bait, etc. Therefore, it is preferable to first detect termites at the bait holder with a nontoxic medium while monitoring the site. After termites are detected, the toxic bait is applied to the bait holder.

Such systems must be inspected periodically, such as every one to three months, to determine if termites are active within the bait holder. However, to accomplish this, a baiting system must deal with several issues that left unresolved, make a baiting method and/or system less likely to succeed. For example, when inspecting the monitoring medium or the bait within the bait holder or when adding or replacing the toxic bait, the feeding site is typically disturbed. This may cause the termites to abandon the bait holder altogether.

SUMMARY OF THE INVENTION

Among the several objects and features of the present invention may be noted the provision of such a device that permits termite detection and baiting in a manner where the transition of feeding termites from nontoxic to toxic bait is effected with minimal, if any, disturbance of the nontoxic bait feeding site; the provision of such a device that permits efficient removal and installation of a pest control toxin; and the provision of such a device that is simple to use.

According to one embodiment, the invention relates to apparatus for detecting and/or controlling subterranean termites. The apparatus includes a station at least partially receivable within a subterranean cavity, the station having at least one opening therein to provide access by the termites to an interior volume of the station. The apparatus also includes an aggregation base attractive to the termites received within the interior volume of the station, the aggregation base including at least one void for forming an aggregation site for the termites. The apparatus further includes a replaceable container received within the interior volume of the station and positioned adjacent the aggregation base, the container having at least one opening in a surface thereof facing the aggregation base to permit the passage of termites from the aggregation base to an interior chamber of the container, and the container being sized and shaped such that the container may be removed from the station without disturbing the aggregation base, thereby preserving any aggregation site formed by the termites within the aggregation base.

In another embodiment, the invention includes apparatus for detecting and/or controlling subterranean termites. The apparatus is at least partially receivable within a subterranean cavity accessible to termites and is also accessible above-ground by a user. The apparatus includes an aggregation base attractive to the termites received within the cavity, the aggregation base configured to form an aggregation site for the termites. The apparatus also includes a replaceable container received within the cavity adjacent the aggregation base. The container is sized and shaped such that the container may be removed from the cavity and replaced with another container without removing the aggregation base, thereby preserving any aggregation site formed by the termites within the aggregation base. The container further includes at least one opening configured to allow passage of termites from the aggregation base to within the container.

In yet another embodiment, the invention is a method for detecting and/or controlling subterranean termites. The method includes providing a subterranean cavity accessible to the termites and inserting a station into the cavity such that it is at least partially received within the subterranean cavity. The method also includes positioning an aggregation base attractive to the termites in the cavity, the aggregation base including at least one void forming an aggregation site for the termites and positioning a replaceable container within the cavity adjacent the aggregation base, the container enclosing a monitoring medium attractive to the termites. The method further includes removing the replaceable container periodically to monitor the aggregation base to detect the presence of termites within the cavity, the replaceable container being sized and shaped such that the container may be removed from the cavity without disturbing the aggregation base, thereby preserving any aggregation site formed by the termites within the aggregation base.

In a further embodiment, the invention is a method for controlling or eliminating subterranean termites. The method includes providing a subterranean cavity accessible to the termites, and inserting a station into the cavity such that it is at least partially received within the subterranean cavity. The method further includes positioning an aggregation base attractive to the termites in the cavity, the aggregation base including at least one void forming an aggregation site for the termites and positioning a replaceable container within the cavity adjacent the aggregation base, the container enclosing a bait both attractive and toxic to the termites. The method also includes removing the replaceable container periodically to monitor the aggregation base to detect the presence of termites within the cavity.

In a further embodiment, the invention relates to a replaceable container for use with apparatus for detecting and/or controlling subterranean termites, the apparatus having a substantially stationary aggregation base attractive to the termites for forming an aggregation site. The replaceable container includes a cup comprising a bottom and an imperforate sidewall defining an interior chamber, the bottom having at least one opening facing the aggregation base to permit the passage of termites from the aggregation base to the interior chamber of the cup. The container also includes a material received within the container, wherein the material comprises at least one of a monitoring medium attractive to the termites and a bait both attractive and toxic to said termites. The container is sized and shaped such that the container may be removed from the apparatus without substantially disturbing the aggregation base.

Other objects and features will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENTS

Figure 1:
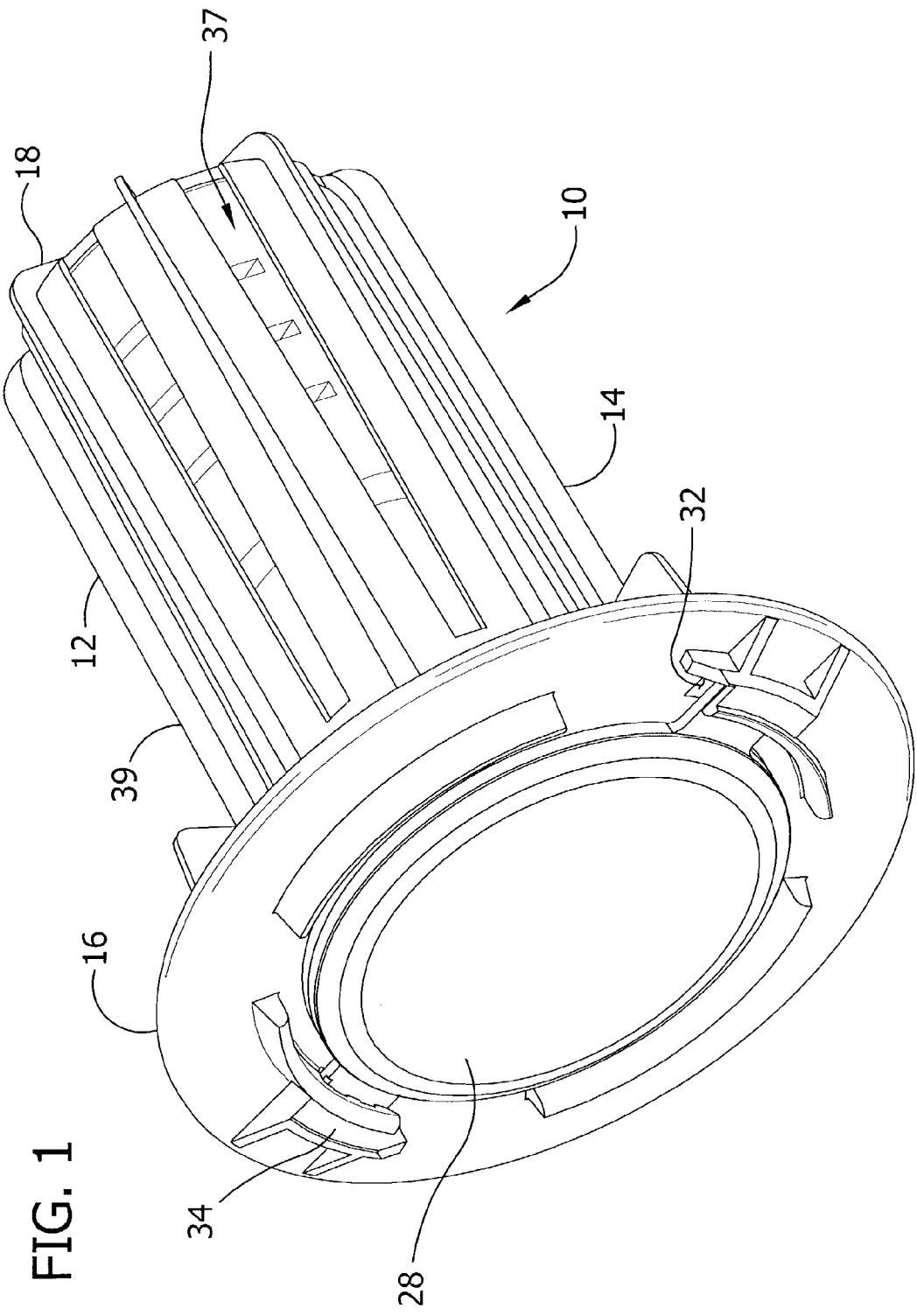
FIG. 1 is a perspective of an embodiment of the pest control device of the present invention.
Figure 2:
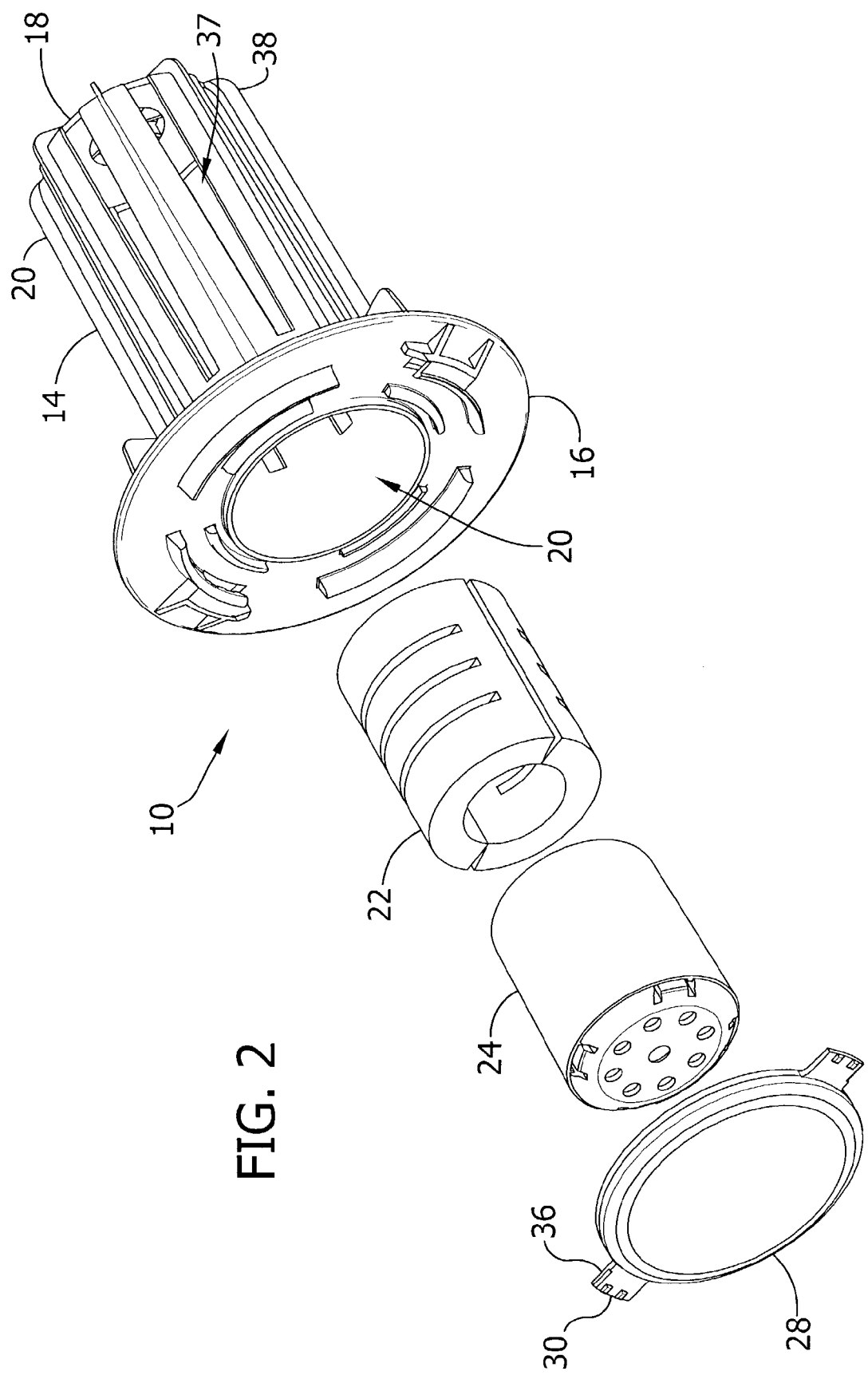
FIG. 2 is an exploded perspective of the pest control device of FIG. 1.

FIGS. 1 and 2 illustrate a pest monitoring and control station, generally illustrated by reference numeral 10, in accordance with one embodiment of the present invention. Although the illustrated embodiment is particularly suitable for monitoring and controlling termites, it is contemplated that the invention may be used to monitor and control other pests, such as ants. As best illustrated in the exploded view of FIG. 2, the station 10 includes a substantially hollow housing 12 having an annular side wall 14, a top surface 16 and a bottom surface 18 defining an interior volume 20. A portion of the top surface 16 of the housing 12 is open exposing the interior volume 20. The station 10 receives one or more of an aggregation base 22, a monitoring container 24, or replaceable container, and/or a bait container 25 (not shown but described below with reference to FIG. 5) within the interior volume 20 of the housing 12.

A cap 28 is removably received on the top surface 16 to close the housing 12. The cap 28 is removably secured to the top surface 16 of the housing 12. In one embodiment, the cap 28 has a pair of tabs 30 that extend into slots 32 in the top surface 16 of the housing 12. The cap 28 is then rotated either counter clockwise or clockwise to engage the cap 28. The tabs include a chamfer 34 along a leading edge 36 of the tab 30. As the cap 28 rotates into position, the chamfer 34 helps guide the tab 30 into position within the slot 32. Other suitable means for securing the cap 28 to the top surface 16 may be used.

Preferably, the housing 12 is formed from a durable, corrosion resistant material, as for example, an acrylic or high strength plastic. Although shown as having a generally cylindrical shape, the housing 12 may be any other suitable shape, such as rectangular. Preferably, the station 10 has a maximum height of less than about 18 inches (457 mm) and maximum diameter or width of less than about 12 inches (305 mm), and more preferably the station has a maximum height of less than about 9 inches (229 mm) and maximum width of less than about 4 inches (102 mm).

The station 10 includes at least one opening 37 passing through the side wall 14 to permit the ingress and egress of termites into and out of the interior volume 20 of station. Preferably, the side wall 14 has several vertical elongated openings 37 therein extending substantially the entire length of the side wall. As used herewith, vertical is used in reference to the preferred orientation of the station 10 with the top surface 16 facing in an upward direction. It is contemplated however, that other shapes and orientations for the openings may be used. For example, the openings may be horizontal elongated openings, or may be circular openings randomly placed or formed in a repeating pattern. Additionally, there may be openings 37 in the bottom surface 18 leading to the interior volume 20. In an alternate version, the openings 37 are formed only in a lower portion 38 of the side wall 14 of the housing 12 such that an upper portion 39 of the side wall 14 near the top surface 16 of the housing 12 is imperforate.

In use, the station 10 is at least partially received within a cavity accessible to termites, while still being accessible above ground by a user. The cavity may be a subterranean cavity, or may be a cavity within a wall or other framework of a building or other above ground structure. The cavity may be formed in the soil, or the cavity may be formed in a paving material, such as concrete or asphalt, with soil beneath the paving material. Preferably, the station 10 is substantially entirely received within the cavity such that only the top surface 16 and cap 28 are accessible from above ground. However, in some situations, the station 10 may be nearly entirely on top of the ground, such that the cavity is very shallow.

In one embodiment, as shown in FIG. 2, the aggregation base 22 is received within the interior volume 20 of the housing 12 such that it is positioned adjacent the lower portion 38 of the side wall 14 so that the elongate openings 37 expose the aggregation base 22 to the subterranean cavity. The monitoring container 24, or replaceable container, or the bait container 25 is then received within the interior volume 20 of the housing so as to be received adjacent to the aggregation base 22. It is also contemplated that the aggregation base may be formed as a tube and the replaceable monitoring container 24 or bait container 25 configured to be received within the hollow interior of the tube.

Alternately, the aggregation base 22 is received directly within the cavity. For example, when the aggregation base 22 is to be used in a more durable environment where there is little possibility that sidewalls of the cavity will collapse around the aggregation base 22, such as, for example, in paving material, the aggregation base 22 can be placed directly into the cavity. The monitoring container 24 or the bait container 25 then may be positioned in the cavity adjacent to, and preferably directly above, the aggregation base 22. In such an embodiment, there is no need for a station to receive the aggregation base 22 and the containers 24, 25. A suitable cap, designs of which are known in the art, would then be placed over the cavity to secure the aggregation base 22 and containers 24 or 25 within the cavity. However, in the above embodiments, the aggregation base 22 is located in the cavity or station 10 in a substantially stationary manner so that there is minimal disturbance to the aggregation site and the termites while the containers 24 or 25 are being inspected, removed and/or replaced.

Figure 3:
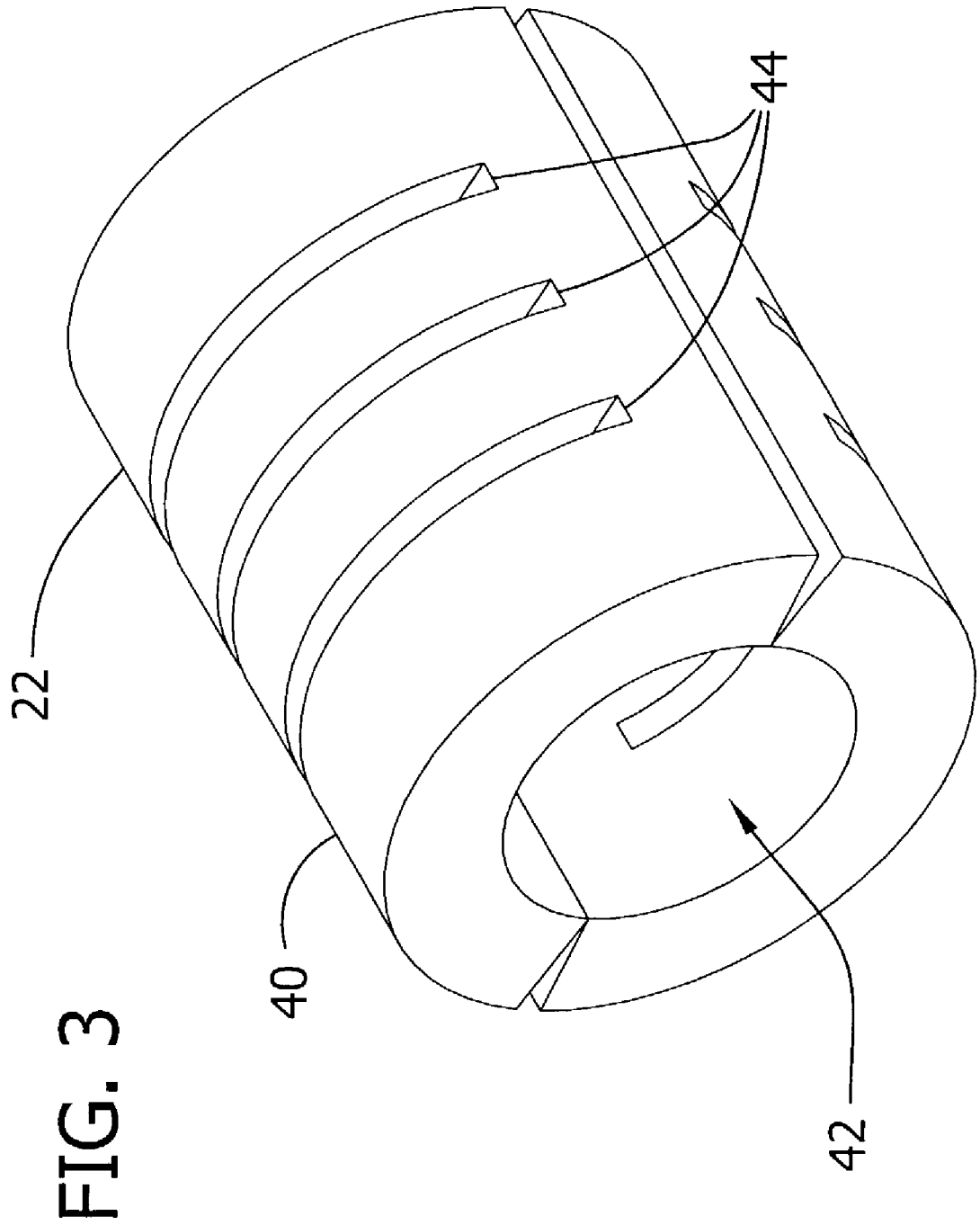
FIG. 3 is a perspective of an aggregation base used with the pest control device of FIG. 1.

FIG. 3 illustrates an embodiment of the aggregation base 22. In the illustrated example, the aggregation base is formed in a generally cylindrical shape such that an outer surface 40 of the aggregation base faces the interior of the sidewall 14 of the station 10 or cavity when placed in service. Other versions of the aggregation base may have different geometric shapes suitable for use depending on the cavity into which the base is received. In an embodiment of the aggregation base 22 to be received within the interior volume 20 of the station 10, it is preferable that the aggregation base 22 have a shape similar to the shape of the housing 12 with a width slightly less than an inner width of the housing 12 so that the aggregation base 22 may be removably received in a snug fitting relationship within the housing 12. Preferably, the aggregation base 22 has a void 42 substantially centrally located within the aggregation base 22 which is suitable for an aggregation site for termites. The aggregation base 22 includes channels 44 passing through the aggregation base 22 from the outer surface 40 inward to the void 42. Preferably, the channels 44 guide the termites from the outer surface 40 to the aggregation site in the void 42 of the aggregation base 22. Preferably, the aggregation base 22 is made from a cellulosic material attractive to termites, such as wood.

Alternately, the aggregation base 22 may be made of plastic or other suitable material and filled with cellulosic material, such as paper, cardboard, compressed tablets, or other suitable feeding material and may have holes providing access to the feeding material. In such a version, the aggregation base 22 may be similar in construction to the container 24. Additionally, the aggregation base may be made from a foam material. In some of these embodiments, the aggregation base may not have a void space free of material, but the base is still preferably configured so that termites feeding on the aggregation base or material within the aggregation base will form an aggregation site within the base.

Figure 4:
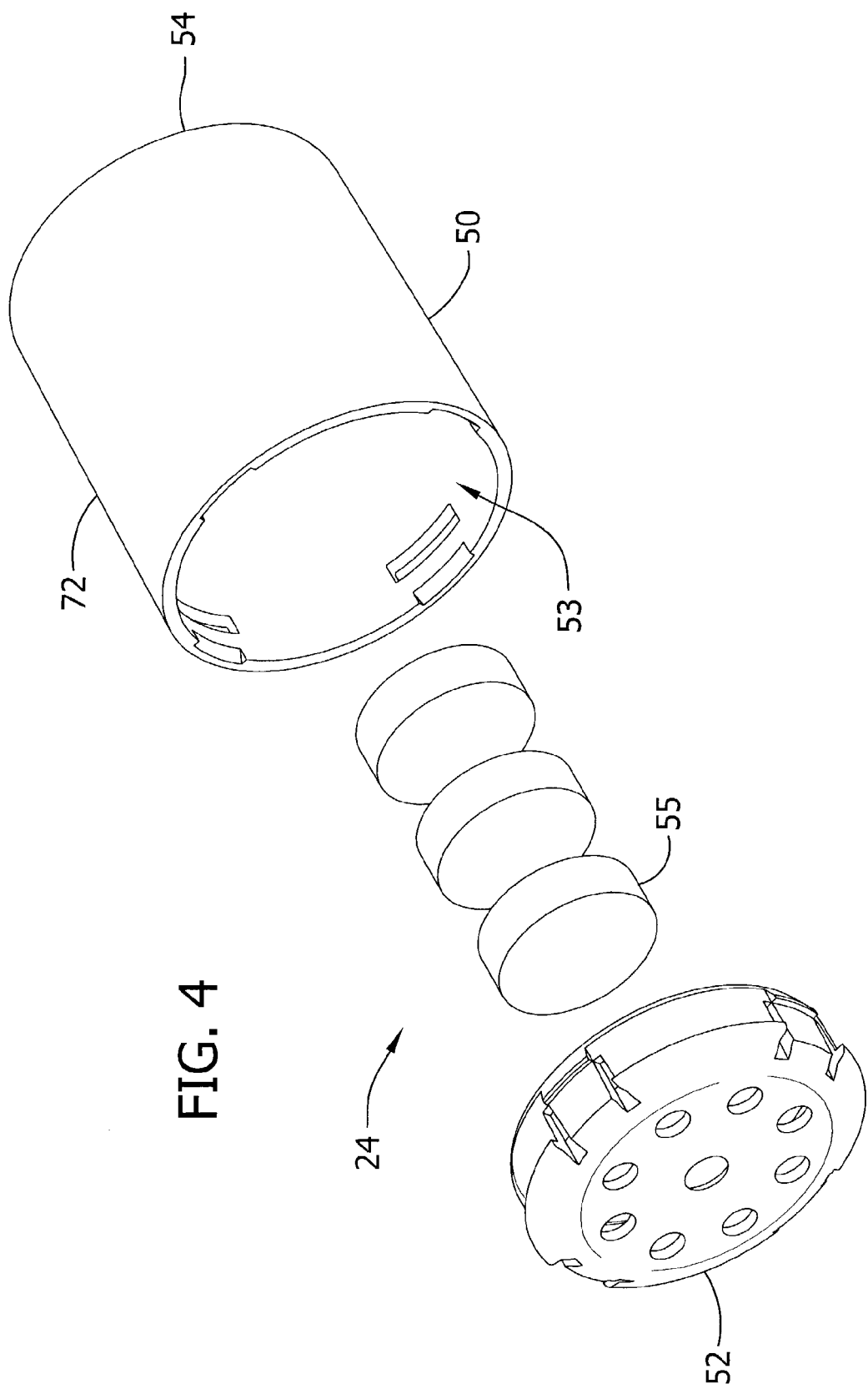
FIG. 4 is an exploded perspective of a container used in the pest control device of FIG. 1.

Referring now to FIG. 4, the monitoring container 24 comprises a cup 50. The cup 50 may have an accompanying lid 52. As illustrated, the cup 50 has a bottom surface 54 opposite the lid 52 so that the monitoring container 24 is configured as a closed cylinder defining an interior chamber 53 to complement the configuration of the housing 12. The bottom surface 54 is described as the surface adjacent the aggregation base 22 when the monitoring container 24 is placed in the station 10 in an operational fashion, and for convenience, the lid 52 comprises the opposite surface. However, it is contemplated that the monitoring container 24 may also be inserted into the station 10 with the lid 52 adjacent the aggregation base 22. An outer width of the cup 50 is slightly less than an inner width of the housing 12 (FIG. 2) so that the cup may be removably received within the housing. Preferably, the container 24 is made of plastic. Referring to now FIG. 5, the bait container 25 preferably is of construction similar to that of the monitoring container 24 and corresponding parts are indicated by the same reference numerals.

Figure 5:
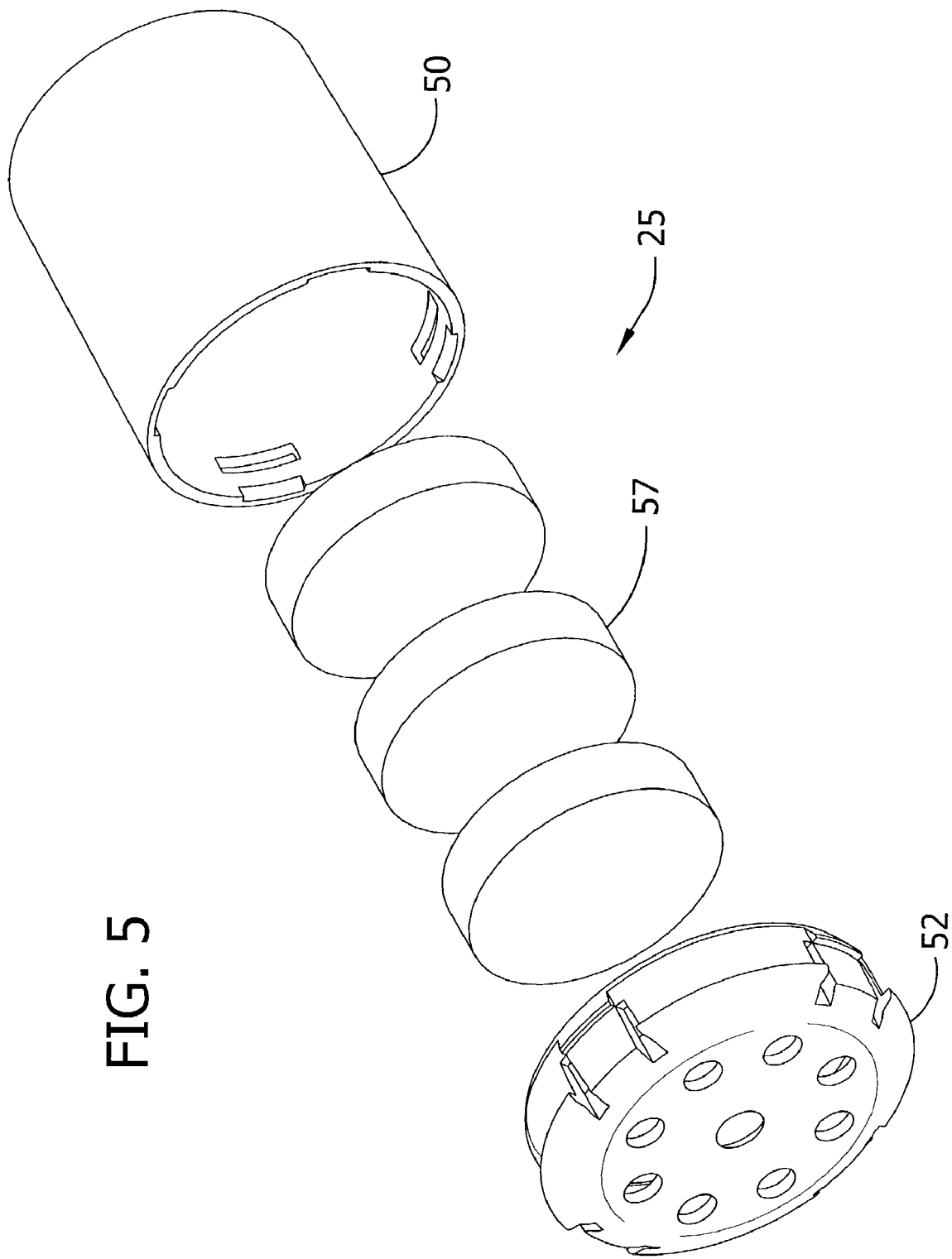
FIG. 5 is an exploded perspective of a bait container similar in construction to the monitoring container of FIG. 4 with a bait placed therein.

Referring to both FIGS. 4 and 5, a suitable material such as a monitoring medium 55 (shown in FIG. 4) that is attractive to termites may be received within the chamber 53 of the monitoring container 24. A suitable material such as bait 57 which is both attractive and toxic to termites may be received within the chamber 53 of the bait container 25. The monitoring medium 55 and the bait 57 preferably are in the form of tablets that are easily insertable into the chamber 53. Use of the monitoring medium 55 and the bait 57 will be more fully discussed below.

Preferably, the combined length of one container 24 or 25 and the aggregation base 22 is less than the length of the housing 12 so that the container 24 or 25 can be received within the housing 12 in a manner which will not interfere with placement of the cap 28 to cover the top surface 16 of the housing 12. Preferably, for reasons which will be more fully discussed below, the lid 52 and/or the cup 50 are transparent (or at least partially transparent).

Figure 6:
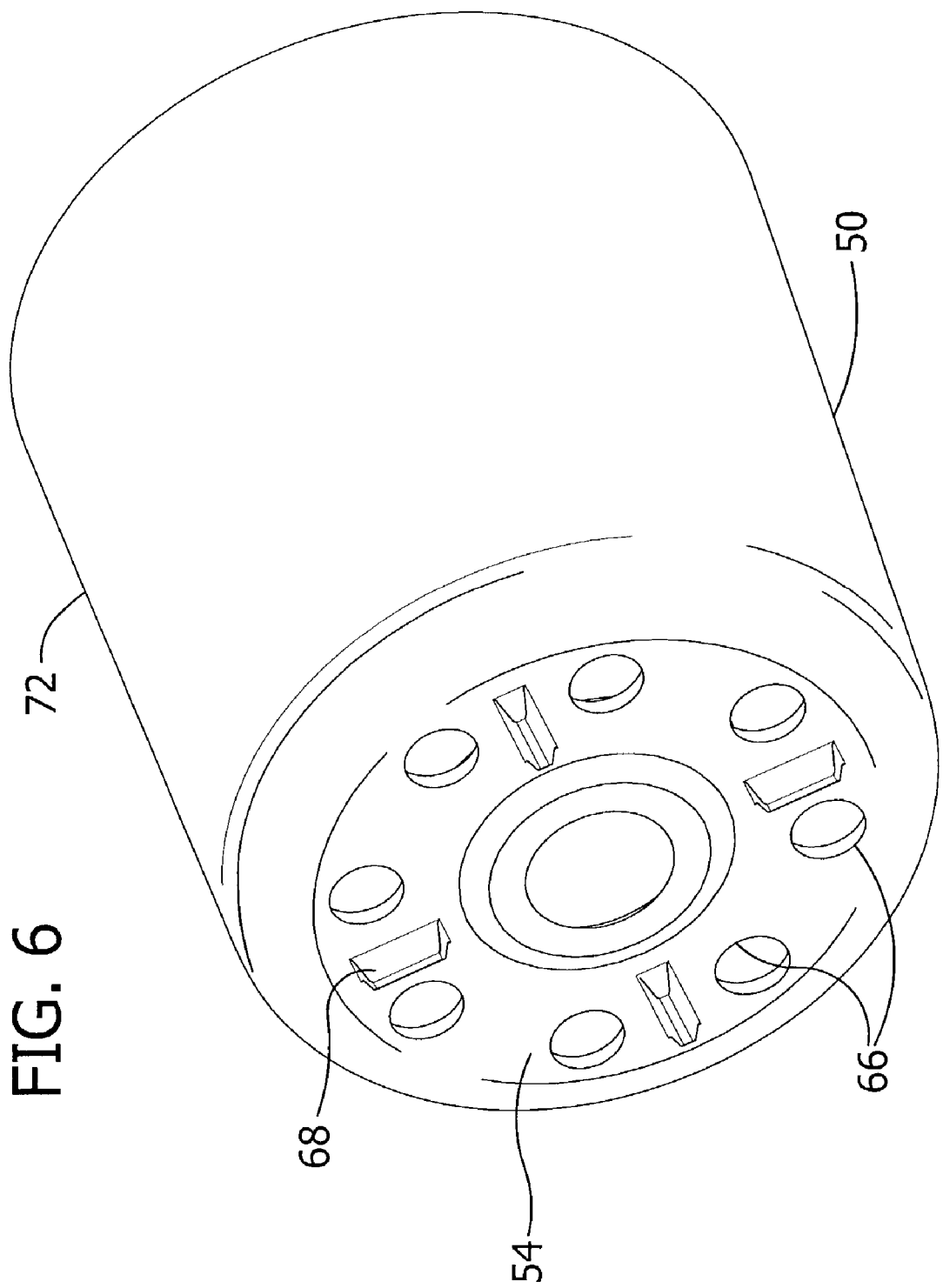
FIG. 6 is a perspective of a cup portion of the container of FIG. 4.

As shown in FIG. 6, the cup 50 has at least one opening 66 in the bottom surface 54 facing the aggregation base 22. The opening 66 in the bottom surface 54 leads to the interior of the cup 50 when the container 24 or 25 is received in an operational position within the housing 12 thereby allowing the termites to move from the aggregation base 22 too within the interior of the cup. Multiple openings 66 are preferred in the bottom surface, but a single opening design is also contemplated. For example, the cup 50 may have a single opening 66 with a slightly irregular shape (e.g., cloverleaf shape). Additionally, it is contemplated in some versions that the cup 50 may have holes in the sidewalls thereof. The termites must have access to the openings 66 in the cup 50 from the aggregation base 22. In one embodiment, small legs 68 on the bottom surface 54 of the cup 50 space the cup from the aggregation base 22 to provide a gap for termite exploration.

The monitoring container 24 is configured to be replaceable received adjacent the aggregation base 22 (see, e.g., FIG. 2), such that the monitoring container 24 may be removed, inspected and/or replaced without disturbing the aggregation base 22, thereby preserving any aggregation site formed by the termites in the aggregation base 22, such as within the void 42. Similarly, the bait container 25 is configured to be replaceably received adjacent the aggregation base 22, such that during use, either the monitoring container 24 or the bait container 25 is positioned adjacent the aggregation base.

The lid 52 of the containers 24, 25 also may have at least one opening 70 (see FIG. 8), the at least one opening allowing the termites to move into and out of the container through the lid 52 of the container. Additionally, the openings 70 prevent the container 24, 25 from floating if the station 10 or cavity fills with water. Also, if the monitoring medium 55 or bait 57 received within the containers 24, 25 becomes water soaked and expands, the openings 66, 70 provide room for expansion, yet keep the bait inside the containers. Sides 72 of the cup 50 are preferably free of openings so that the termites passing through the openings 37 in the housing 12 are driven down to the aggregation base 22 so that the initial aggregation site is formed in the aggregation base. However, when the cup 50 is used as a monitoring container 24, openings may also be included in the sides.

Figure 7:
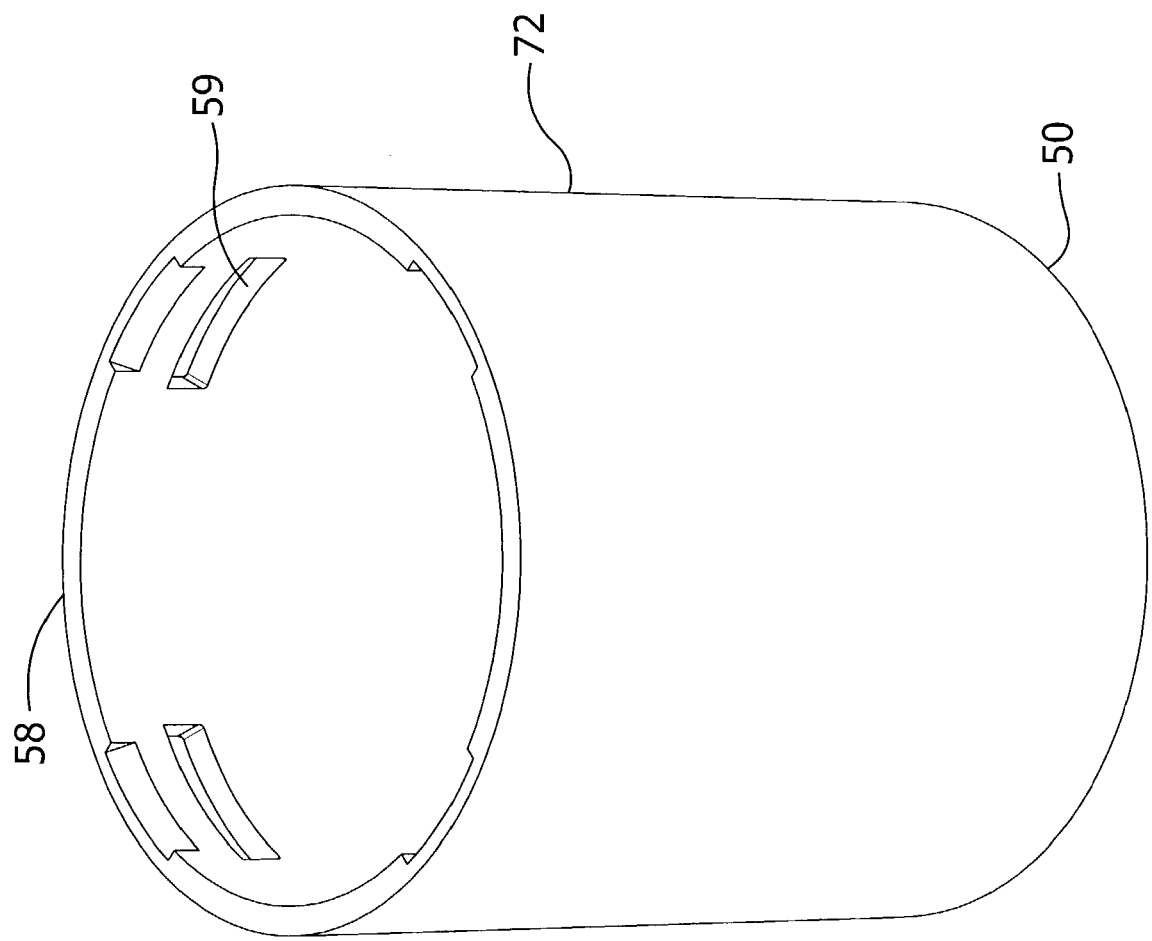
FIG. 7 is another perspective of the cup of FIG. 4.
Figure 8:
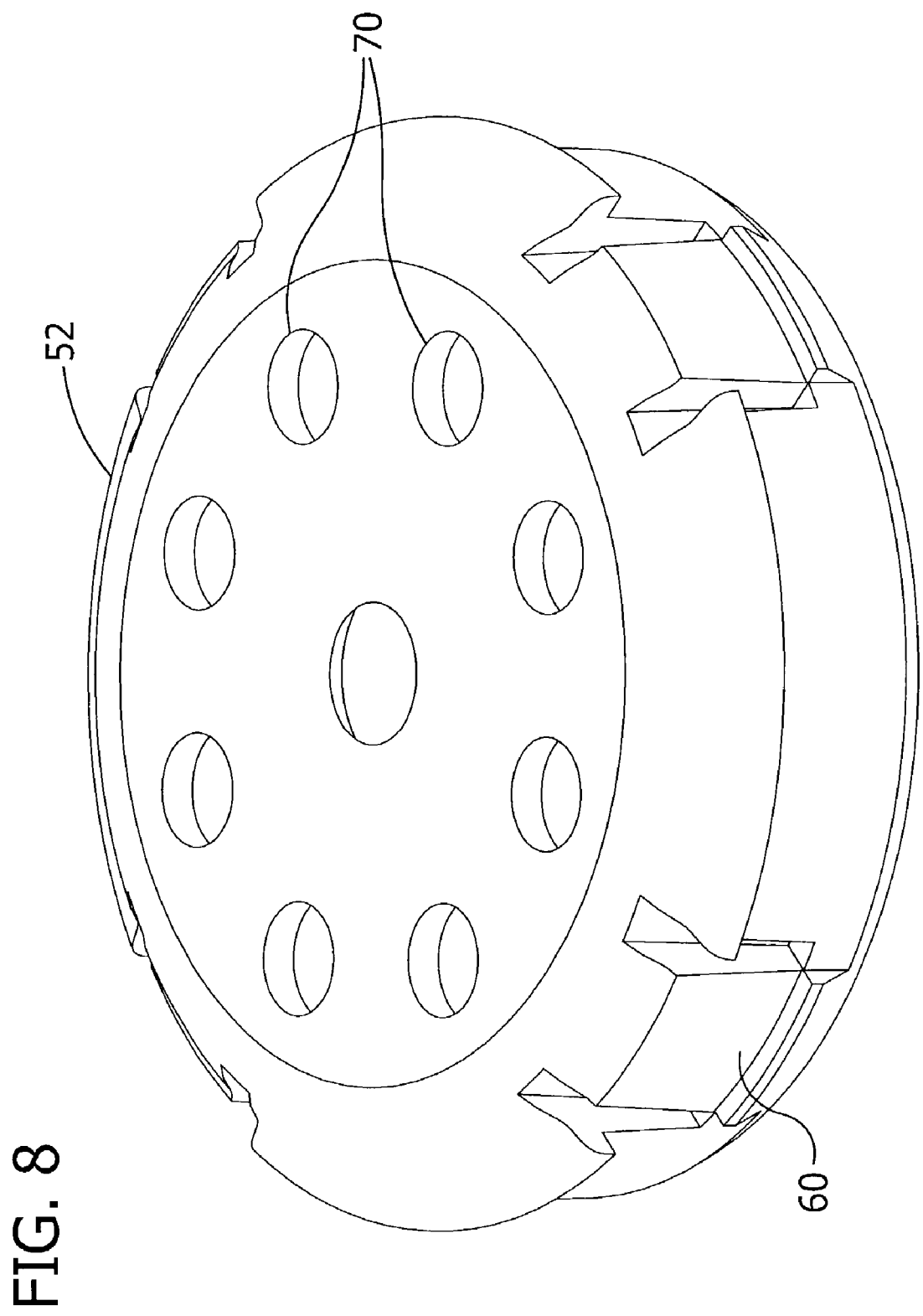
FIG. 8 perspective of a lid portion of the container of FIG. 4.

The lid 52 is removably secured to the cup 50 using any suitable means. Referring to FIG. 7, in one embodiment, the cup 50 has several recesses 59 near a top rim 58 thereof. FIG. 8 illustrates corresponding flanges 60 on the lid 52 that are received in the recesses 59 to secure the lid 52 to the cup 50. Alternately, a circular threaded portion (not shown) of the cup 50 extends upwardly, and a complementary threaded base portion (not shown) of the lid 52 is removably securable to the cup 50 by screw threads.

In operation, a cavity of appropriate dimensions can be made in the soil for positioning of the station 10. Typically, the aggregation base 22 and monitoring container 24 are placed inside the station housing 12, and the station 10 is then inserted or pressed into the cavity until the top surface 16 of the station housing 12 is near the soil surface. However, in some instances, such as when there is a known presence of or conditions conducive for termites, it may be desirable to directly begin using the bait container 25 with the aggregation base 22 and not use a monitoring container 24. Alternatively, the aggregation base 22 is placed directly into the cavity. The container, either 24 or 25, is then placed into the cavity adjacent the aggregation base 22. The description below will describe the aggregation base 22 as being placed within the station 10, but it is contemplated that the aggregation base may be placed adjacent to the monitoring container 24 or bait container 25 without the use of a station 10 as described above. Termites locate the station 10 and the aggregation base 22 as the result of their foraging in search of food sources.

As termites approach the outside of the station 10, they quickly enter through the openings 37 and move inside to find the aggregation base 22, which is a potential food source. The openings 37 in the station encourage the termites to quickly pass through the side wall 14 to the aggregation base 22. If the termites enter through the openings 37 and contact the container 24 or 25 above the aggregation base 22, the imperforate sidewalls of the container direct the termites down along the elongate openings 37 to the aggregation base 22. The channels 44 encourage the termites to enter the aggregation base 22 and begin to use the internal void 42 created by the base as an aggregation site. The void 42 creates a stopping area in the center for aggregation. Once inside, they will move toward the top of the aggregation base 22 and into the monitoring container 24. Because only the monitoring container 24 is removed to monitor for termite activity, the aggregation base 22 remains undisturbed, thereby maintaining the void 42 of the aggregation base 22 and the aggregation site therein intact.

The station 10 can be inspected periodically for evidence of termite infestation by visually examining the monitoring container 24 for signs of infestation. Inspection of the station 10 can be performed weekly, bi-weekly, monthly, etc. as needed or desired. An inspection is performed by removing the cap 28 and visually inspecting the chamber 53 of the monitoring container 24 or the aggregation base 22 for termite attack. Because of the nature of termite attack against a cellulosic material, such as the monitoring medium 55 or the aggregation base 22, visible signs or evidence of such attack will invariably be left on the monitors. This evidence can include, for example, exploratory tunnels built by termites as they consume the material in such a way that telltale signs of termite infestation are left on the surface of the material and/or mud tubing constructed over and across the interior surface of the station housing 12 or monitoring container 24. Such signs of infestation would be obvious to anyone skilled in the art of termite damage detection. If termite attack is discovered, the station 10 is baited by replacing the monitoring container 24 with a bait container 25. Alternately, the monitoring medium 55 can be removed and replaced with the bait 57. If no termite attack is discovered, the monitoring container 24 is returned to the station 10. The cap 28 is replaced and the station 10 is inspected again after the appropriate interval.

Termites consuming the aggregation base 22 will discover and transition to feeding upon the nearby monitoring medium 55 in the monitoring container 24. This can be for one or more reasons. If the monitoring medium 55 is of a consistency more preferred by termites than the aggregation base 22, then termites may cease to consume the aggregation base 22 and transition to consuming the monitoring medium 55 before the entire aggregation base 22 is consumed. If termites continue to consume the aggregation base 22, the termites will still transition in the normal process of termite foraging to consuming the monitoring medium 55 when the aggregation base 22 is entirely consumed. Because the monitoring medium 55 is nearby and is of a nature preferably consumed by termites, they invariably begin consuming the monitoring medium.

Once termites have been discovered attacking the monitoring medium 55 or aggregation base 22, the station 10 is baited with the toxicant containing bait 57. Preferably, the monitoring container 24 is removed and replaced with the bait 57 in container 25. The toxicant-containing bait may be in the form of purified cellulose toxicant delivery tablets. One suitable termite bait composition is described in co-assigned U.S. Pat. No. 6,416,752 entitled "Termite Bait Composition and Method", the disclosure of which is incorporated herein in its entirety by reference.

The toxicant in the bait 57 is preferably of the delayed-action type, or an insect growth regulator, pathogen or metabolic inhibitor. Preferably, it comprises a nontoxic bait composition to which the pesticide toxicant is added. Any suitable termite pesticide composition may be used in connection with the present invention. In one embodiment, the bait is in the form of tablets. For example, in one suitable embodiment, the bait 57 comprises at least one compressed tablet having a mass of between about 10 grams (0.35 ounce) and about 45 grams (1.6 ounces), more preferably between about 25 grams (0.88 ounce) and about 40 grams (1.4 ounces), and even more preferably about 35 grams (1.2 ounces).

The removal, inspection and/or replacement of the containers 24, 25 within the housing 12 does not substantially disturb the pre-existing network of access galleries or passageways previously established between the termite colony or nest and the aggregation site in the aggregation base 22 since the base is not displaced during removal and substitution of the container 24, 25. Thus, the disturbance of the aggregation site in the aggregation base 22 is minimized, reducing the likelihood that the termites will abandon the feeding site. Also, communication and access between the pesticide containing container 25 and the termite colony is quickly established upon substitution of the monitoring container 24 with the bait container 25. Foraging termites ingest the pesticide-containing bait 57 and also return portions of the toxic bait to the nest through the pre-existing network of passageways.

The station 10 is inspected at regular intervals (e.g., every 15 to 120 days) to assess the extent of termite consumption of the bait 57. When the bait 57 in the container 25 has been substantially consumed, more bait can be added by removing the lid 52 and inserting more bait in the container 25 or simply by replacing the container with a fresh container. Thus, during normal inspection and/or replacement of containers 24, 25, the aggregation base 22 is not removed and disturbance to the aggregation site is minimized. It may be necessary to periodically replace the aggregation base 22 (e.g., once a year to freshen up the aggregation base 22). This however, is not usually done while termites are actively feeding from the site.

Thus, the present invention provides a control system and method for effectively dealing with termites and reduces the likelihood that the termites will abandon the feeding system after inspections by providing an aggregation base 22 that does not have to be removed for inspection. Instead, visual inspection for termite attack can take place with care taken to not move, remove or disturb the aggregating medium, the termites (if any) infesting the aggregating medium or any termite tunnels leading from the aggregating medium out of the pest control system to the termite colony.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above without departing from the scope of the invention, it is intended that all matter contained in the above description and shown in the accompanying drawings shall be interpreted as illustrative and not in a limiting sense.

What is claimed is:

1. An apparatus for detecting and controlling subterranean termites, said apparatus comprising:
    a station at least partially receivable within a subterranean cavity, said station having at least one opening therein to provide access by said termites to an interior volume of said station;
    an aggregation base attractive to said termites received within said interior volume of said station, said aggregation base being generally cylindrically shaped and including at least one void centrally located within said aggregation base forming an aggregation site for said termites, said aggregation base is made of wood, and wherein said aggregation base further comprises at least one channel passing through the aggregation base leading to said void; and
    a replaceable container received within said interior volume of said station and positioned adjacent said aggregation base, said container being sized and shaped such that the container may be removed from the station without substantially disturbing the aggregation base, thereby preserving any aggregation site formed by the termites within the void of the aggregation base, said container having a bottom surface comprising at least one opening adjacent the aggregation base to permit the passage of termites from the aggregation base to an interior chamber of said container, said container being a cylindrical container comprising said bottom surface, an upper surface, and an annular sidewall, wherein said upper surface comprises at least one opening and said sidewall is imperforate.

2. The apparatus as set forth in claim 1 wherein said replaceable container received within said interior volume of said station is positioned adjacent said void of said aggregation base.

3. The apparatus as set forth in claim 1 wherein said station includes side walls and a bottom and wherein said side walls include vertical elongated openings passing through an entire wall thickness of said station to allow ingress and egress into and out of the station for the termites.

4. The apparatus as set forth in claim 1 further comprising a material received within said replaceable container, wherein said material comprises at least one of a monitoring medium attractive to said termites and a bait both attractive and toxic to said termites.

5. The apparatus as set forth in claim 1 wherein said container is at least partially transparent.

6. The apparatus as set forth in claim 4 wherein said bait is a slow-acting toxicant.

7. The apparatus as set forth in claim 4 wherein said bait is cellulosic material impregnated with a toxicant in the form of a compressed powder, a tablet or granule.

8. The apparatus as set forth in claim 7 wherein said cellulosic material is a purified cellulose tablet.

9. The apparatus as set forth in claim 4 wherein said bait comprises at least one compressed tablet having a mass of between about 20 grams (0.71 ounce) and about 35 grams (1.2 ounces).

10. The apparatus as set forth in claim 9 wherein said at least one compressed tablet has a mass of between about 25 grams (0.88 ounce) and about 30 grams (1.06 ounces).

11. The apparatus as set forth in claim 8 wherein said bait comprises three of said tablets.

12. The apparatus as set forth in claim 1 wherein said station has a maximum height of less than about 9 inches (229 mm) and maximum width of less than about 4 inches (102 mm).

13. The apparatus as set forth in claim 12 wherein said station includes side walls and a bottom and wherein said side walls include vertical elongated openings passing through an entire wall thickness of said station to allow ingress and egress into and out of the station for the termites.

14. The apparatus as set forth in claim 1 wherein said cavity is formed in earth.

15. The apparatus as set forth in claim 1 wherein said cavity is formed in a paving material.

16. An apparatus for detecting and controlling subterranean termites at least partially receivable within a subterranean cavity accessible to said termites, said apparatus further being accessible above-ground by a user, said apparatus comprising:
    an aggregation base attractive to said termites received within said cavity, said aggregation base including at least one void forming an aggregation site for said termites and channels passing completely through said aggregation base from an outer surface of said aggregation base inward to said void, wherein said aggregation base is wood and said void is substantially centrally located within said aggregation base, such that said aggregation base extends laterally outward to face all lateral sides of said subterranean cavity; and
    a replaceable container received within said cavity adjacent said aggregation base, said container being sized and shaped such that the container may be removed from the cavity and replaced with another container without removing the aggregation base, thereby preserving any aggregation site formed by the termites within the aggregation base, wherein said container further comprises at least one opening configured to allow passage of termites from the aggregation base to within said container.

17. The apparatus as set forth in claim 16 wherein said replaceable container received within said cavity is positioned adjacent said void of said aggregation base.

18. The apparatus as set forth in claim 16 further comprising a material received within said replaceable container, wherein said material comprises at least one of a monitoring medium attractive to said termites and a bait both attractive and toxic to said termites.

19. The apparatus as set forth in claim 18 wherein said bait is a slow-acting toxicant.

20. The apparatus as set forth in claim 18 wherein said bait is a cellulosic material impregnated with a toxicant in the form of a compressed powder, a tablet or granule.

21. The apparatus as set forth in claim 20 wherein said cellulosic material is a purified cellulose tablet.

22. The apparatus as set forth in claim 16 wherein said cavity is formed in earth.

23. The apparatus as set forth in claim 16 wherein said cavity is formed in a paving material.

* * * * *

UNITED STATES PATENT AND TRADEMARK OFFICE
CERTIFICATE OF CORRECTION

PATENT NO. : 7,086,196 B2  Page 1 of 1
APPLICATION NO. : 10/400773
DATED : August 8, 2006
INVENTOR(S) : James H. Cink et al.

It is certified that error appears in the above-identified patent and that said Letters Patent is hereby corrected as shown below:

On the Title Page of the issued patent under number item (56) References Cited - U.S. Patent Documents, the following U.S. Patents should have been included:

| | | |
|---|---|---|
| 5,329,726 | 7/1994 | Thorne et al. |
| 6,202,342 | 3/2001 | Edwards |
| 6,205,701 | 3/2001 | Nimocks, III |
| 6,397,516 | 6/2002 | Su |
| 6,416,752 | 7/2002 | Richardson, et al. |

Signed and Sealed this

Twenty-eighth Day of November, 2006

JON W. DUDAS
*Director of the United States Patent and Trademark Office*